United States Patent
Ranki et al.

(10) Patent No.: US 9,609,470 B2
(45) Date of Patent: Mar. 28, 2017

(54) DATA ROUTING FOR POSITIONING

(75) Inventors: Ville Valtteri Ranki, Jorvas (FI); Antti Paavo Tapani Kainulainen, Nummela (FI); Fabio Belloni, Espoo (FI); Kimmo Juhana Kalliola, Espoo (FI)

(73) Assignee: Nokia Technologies Oy, Espoo (FI)

( * ) Notice: Subject to any disclaimer, the term of this patent is extended or adjusted under 35 U.S.C. 154(b) by 158 days.

(21) Appl. No.: 14/131,714

(22) PCT Filed: Jun. 29, 2012

(86) PCT No.: PCT/IB2012/053340
§ 371 (c)(1),
(2), (4) Date: Apr. 15, 2014

(87) PCT Pub. No.: WO2013/008124
PCT Pub. Date: Jan. 17, 2013

(65) Prior Publication Data
US 2014/0295880 A1    Oct. 2, 2014

Related U.S. Application Data

(60) Provisional application No. 61/506,432, filed on Jul. 11, 2011.

(51) Int. Cl.
*H04W 24/00* (2009.01)
*H04W 4/02* (2009.01)
(Continued)

(52) U.S. Cl.
CPC .............. *H04W 4/02* (2013.01); *G01S 3/18* (2013.01); *G01S 5/0063* (2013.01);
(Continued)

(58) Field of Classification Search
CPC ..................................................... H04W 64/00
See application file for complete search history.

(56) References Cited

U.S. PATENT DOCUMENTS

2003/0197645 A1* 10/2003 Ninomiya ................ G01S 3/46
342/464
2005/0043038 A1   2/2005 Maanoja et al.
(Continued)

FOREIGN PATENT DOCUMENTS

| JP | 2011089947 A | 5/2011 |
| WO | 2009/056150 A1 | 5/2009 |
| WO | 2012042315 A1 | 4/2012 |

OTHER PUBLICATIONS

Extended European Search Report received for corresponding European Patent Application No. 12811954.2, dated Feb. 6, 2015, 7 pages.

(Continued)

*Primary Examiner* — Justin Lee
(74) *Attorney, Agent, or Firm* — Locke Lord LLP

(57) ABSTRACT

A system for implementing a positioning functionality. An apparatus (e.g. a directional transceiver) (706) may receive a signal (704) for positioning and measure characteristics associated with the received signal (704). If the directional transceiver (706) then determines that the received signal (704) comprises calculator identifier information, the apparatus may forward the measured characteristics based on the calculator identifier information. Otherwise, the directional transceiver (706) may forward the measured characteristics to a buffer (712). From the perspective of the apparatus (700) transmitting the signal (704) for positioning, a determination may be made as to whether calculator identifier information is known. If determined to be known, the transmitting apparatus (700) may include the calculator identifier information in the signal (704) for positioning. Otherwise, the other apparatus may transmit the signal (704) for positioning without any calculator identifier information.

21 Claims, 14 Drawing Sheets

(51) Int. Cl.
  *G01S 3/18*   (2006.01)
  *G01S 5/02*   (2010.01)
  *G01S 5/04*   (2006.01)
  *H04W 64/00*  (2009.01)
  *G01S 5/00*   (2006.01)
  *G01C 21/20*  (2006.01)

(52) U.S. Cl.
  CPC .............. *G01S 5/0226* (2013.01); *G01S 5/04* (2013.01); *H04W 64/00* (2013.01); *G01C 21/206* (2013.01)

(56) References Cited

U.S. PATENT DOCUMENTS

| | | | |
|---|---|---|---|
| 2005/0138144 A1 | 6/2005 | Sethi | |
| 2005/0186969 A1* | 8/2005 | Lohtia | H04W 4/14 455/456.3 |
| 2006/0075131 A1* | 4/2006 | Douglas | G01S 5/0252 709/230 |
| 2008/0191941 A1 | 8/2008 | Saban et al. | |
| 2009/0046633 A1* | 2/2009 | Thomson | H04W 64/00 370/328 |

OTHER PUBLICATIONS

International Search Report and Written Opinion received for corresponding Patent Cooperation Treaty Application No. PCT/IB2012/053340, dated Nov. 12, 2012, 15 pages.

\* cited by examiner

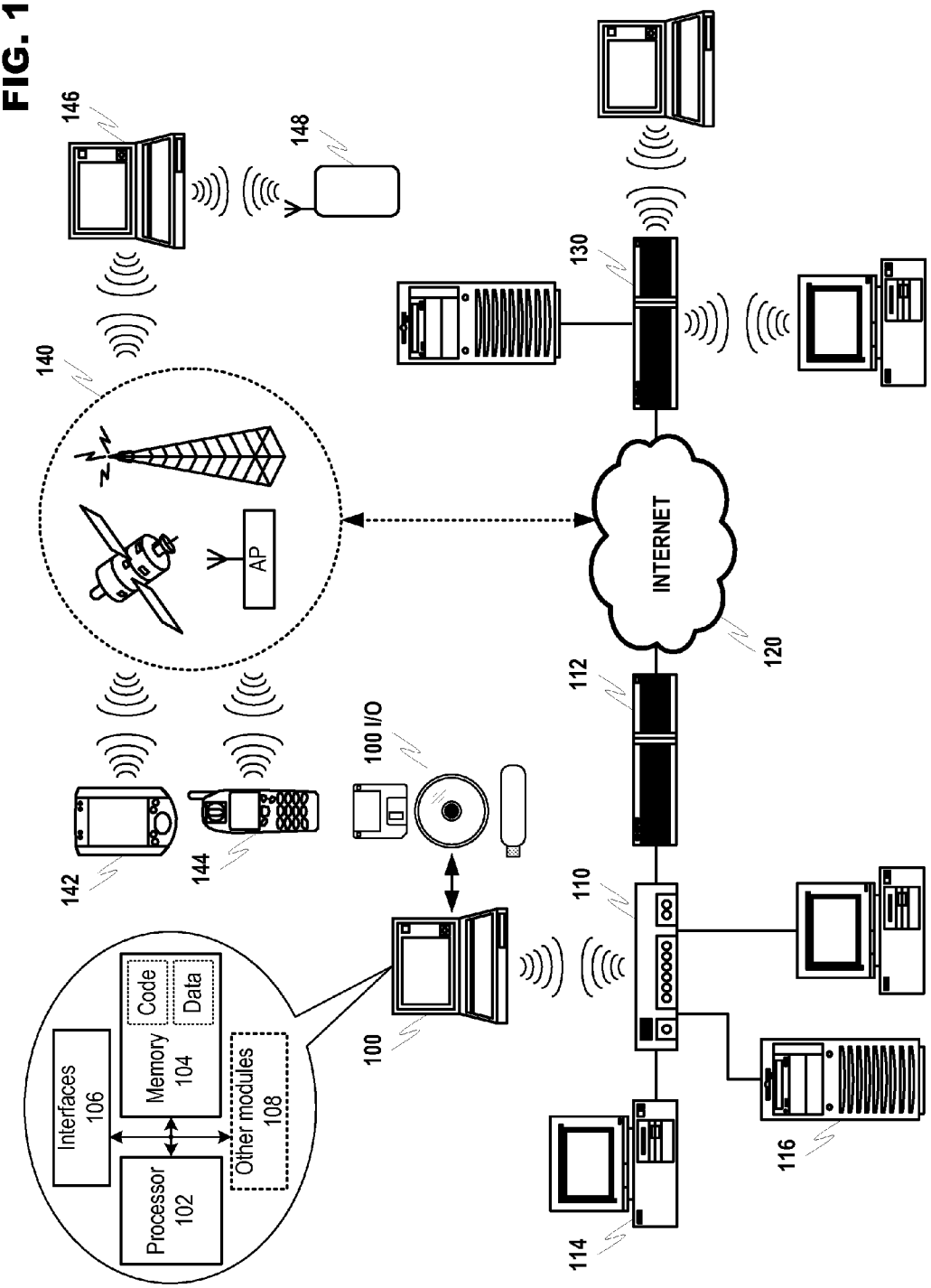

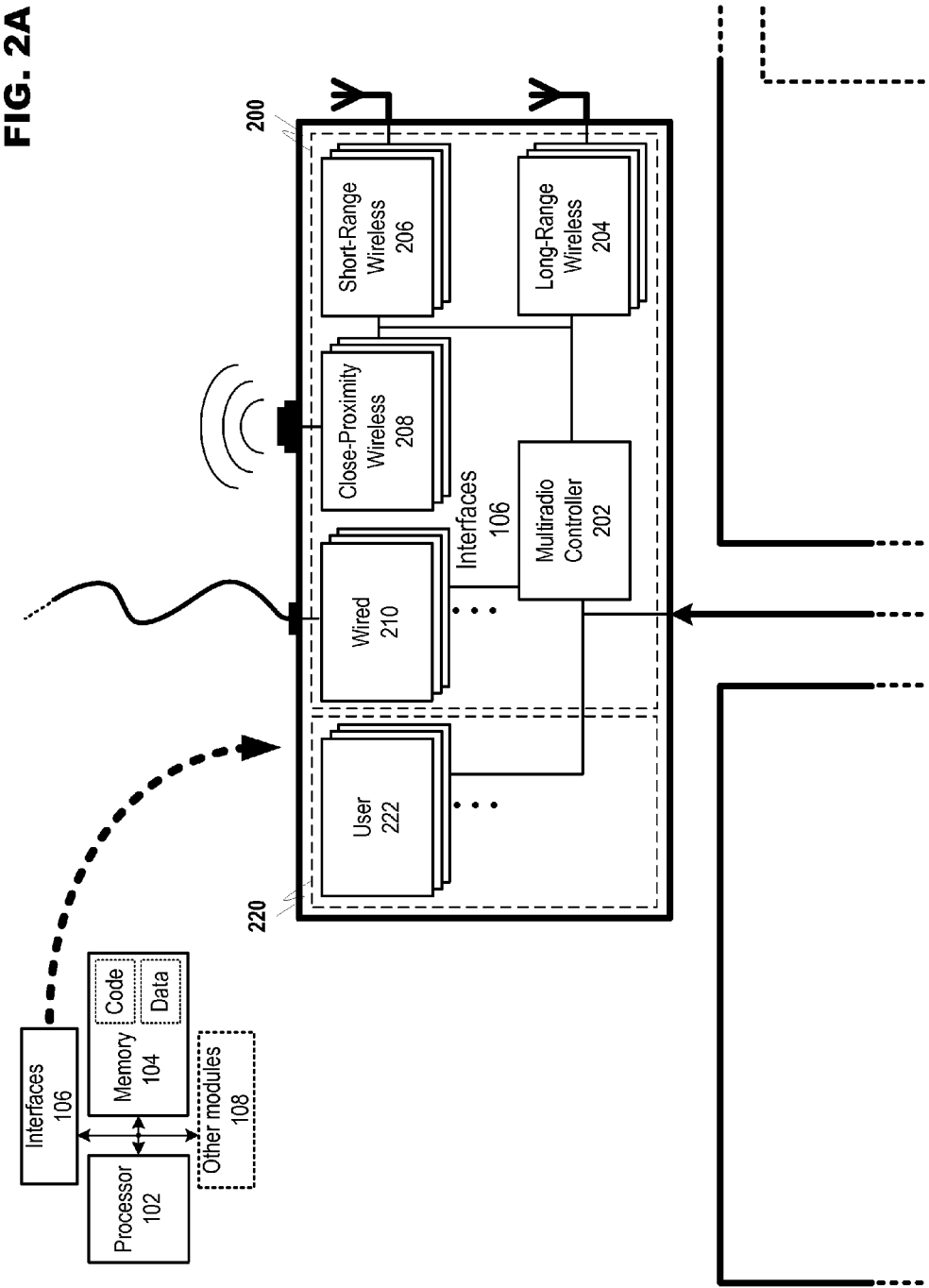

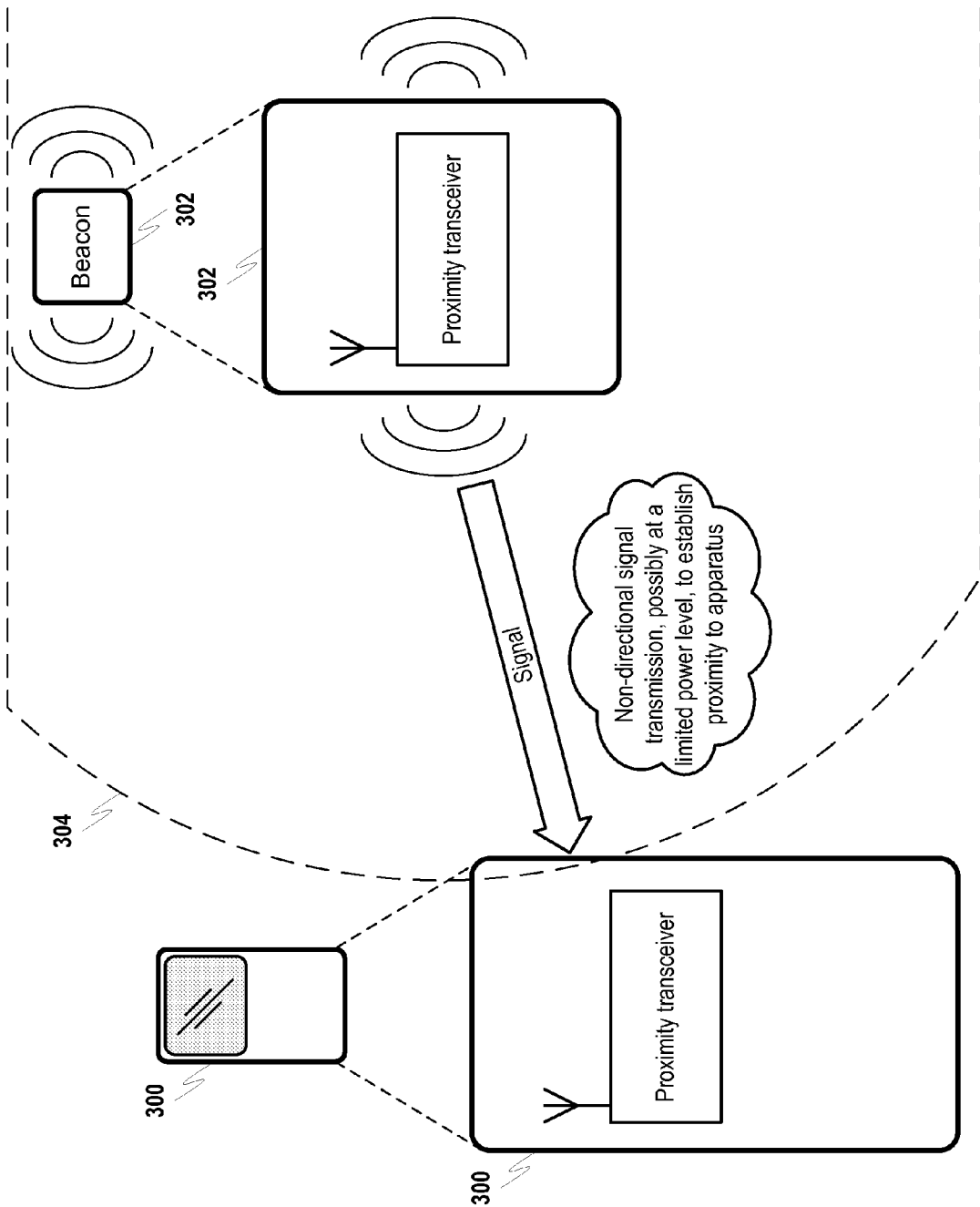

DATA ROUTING FOR POSITIONING

RELATED APPLICATION

This application was originally filed as Patent Cooperation Treaty Application No. PCT/IB2012/053340 filed Jun. 29, 2012 which claims priority benefit to U.S. Provisional Patent Application No. 61/506,432, filed Jul. 11, 2011.

This international application is based on and claims priority to U.S. Provisional Application Ser. No. 61/506,432, filed Jul. 11, 2011, entitled, "Data Routing For Positioning" and of which the entire contents are incorporated herein by reference.

BACKGROUND

1. Field of Invention

The present invention relates to electronic positioning, and in particular, to routing information in a positioning system based on the availability of identifier information.

2. Background

Wireless-enabled apparatuses have evolved past just being able to provide voice communication to a point where they may provide various functionality. For example, mobile wireless devices have become flexible computing platforms on which various applications may be implemented. In addition to the more straightforward communication applications such as voice, email, text messaging, etc., emerging apparatuses may be able to support various games, productivity applications, business applications, database access applications, etc. In addition, wireless-enabled apparatuses may be able to support apparatus location/positioning services.

In the case of apparatus location/positioning services, current implementations may rely upon combinations of specialized hardware and/or software resources in determining apparatus position. For example, dedicated hardware receivers may scan for global positioning system (GPS) signals that may be utilized to accurately determine apparatus location/position in terms of longitude/latitude. This information may be utilized by applications in the apparatus in order to display current user location on a map, to display points of interest around the current user location, to formulate a route from the current user location to a point of interest, etc.

The above location/position system performs well in certain situations, such as when high-end apparatuses are operating outside where they may take advantage of clear GPS signal reception and well-established map data. However, dedicated GPS receivers may occupy crucial space in already crowded apparatuses, and may place substantial burden on apparatus resources like power, processing capacity, etc. As a result, smaller apparatuses that wirelessly interact at a very basic level may not be able to support position/location services. Moreover, GPS positioning is not a viable solution for indoor location/position determination where interference caused by various structures and signal sources may make the signals unreliable.

SUMMARY

Example embodiments of the present invention may be directed to a method, computer program product, apparatus and system for implementing positioning functionality. An apparatus (e.g., a directional transceiver) may receive a signal for positioning and may measure characteristics associated with the received signal. If the directional transceiver then determines that the received signal comprises calculator identifier information, the apparatus may forward the measured characteristics based on the calculator identifier information. Otherwise, the directional transceiver may forward the measured characteristics to a buffer. From the perspective of the apparatus transmitting the signal for positioning, a determination may be made as to whether calculator identifier information is known. If determined to be known, the transmitting apparatus may include the calculator identifier information in the signal for positioning. Otherwise, the other apparatus may transmit the signal for positioning without any calculator identification information.

In at least one example implementation, the directional transceiver may comprise an antenna array including a plurality of antennas. The measured characteristics may comprise the directional transceiver measuring phase and amplitude for the received signal for positioning on the antennas. Moreover, calculator identifier information may comprise an Internet Protocol (IP) address and/or port identifier corresponding to an apparatus (e.g., a calculator) configured to estimate the location of the apparatus that transmitted the signal for positioning. For example, in instances where the directional transceiver determines that the received signal for positioning comprises calculator identifier information, and the calculator identifier information includes at least an IP address, the measured characteristics may be forwarded to a calculator residing at the IP address via an Internet connection.

In example operation from the perspective of the apparatus transmitting the signal for positioning, the calculator identifier information may depend on the calculator. For example, the calculator identifier information may comprise an IP address and/or port identifier of another apparatus (e.g., a remote server, a mobile apparatus, etc.). In an alternative configuration the apparatus may also be configured to process measured characteristics (e.g., for determining its own position), and thus, the calculator identifier information may point to the apparatus itself. It is also possible for the apparatus to be unaware of any calculator identifier information when transmitting a signal for positioning, but then to receive a signal from a directional transceiver comprising calculator identifier information. The received calculator identifier information may then be included in the subsequent transmissions of the signal for positioning. Regardless, the apparatus may in some instances receive positioning information comprising at least one of measured characteristics associated with the signal for positioning or positioning information.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1 discloses example apparatuses, communication configuration and network architecture usable in implementing at least one embodiment of the present invention.

FIG. 2A discloses additional detail with respect to example communication interfaces usable with at least one embodiment of the present invention.

FIG. 3 discloses an example of positioning based on proximity information in accordance with at least one embodiment of the present invention.

DESCRIPTION OF EXAMPLE EMBODIMENTS

Figure 2B:
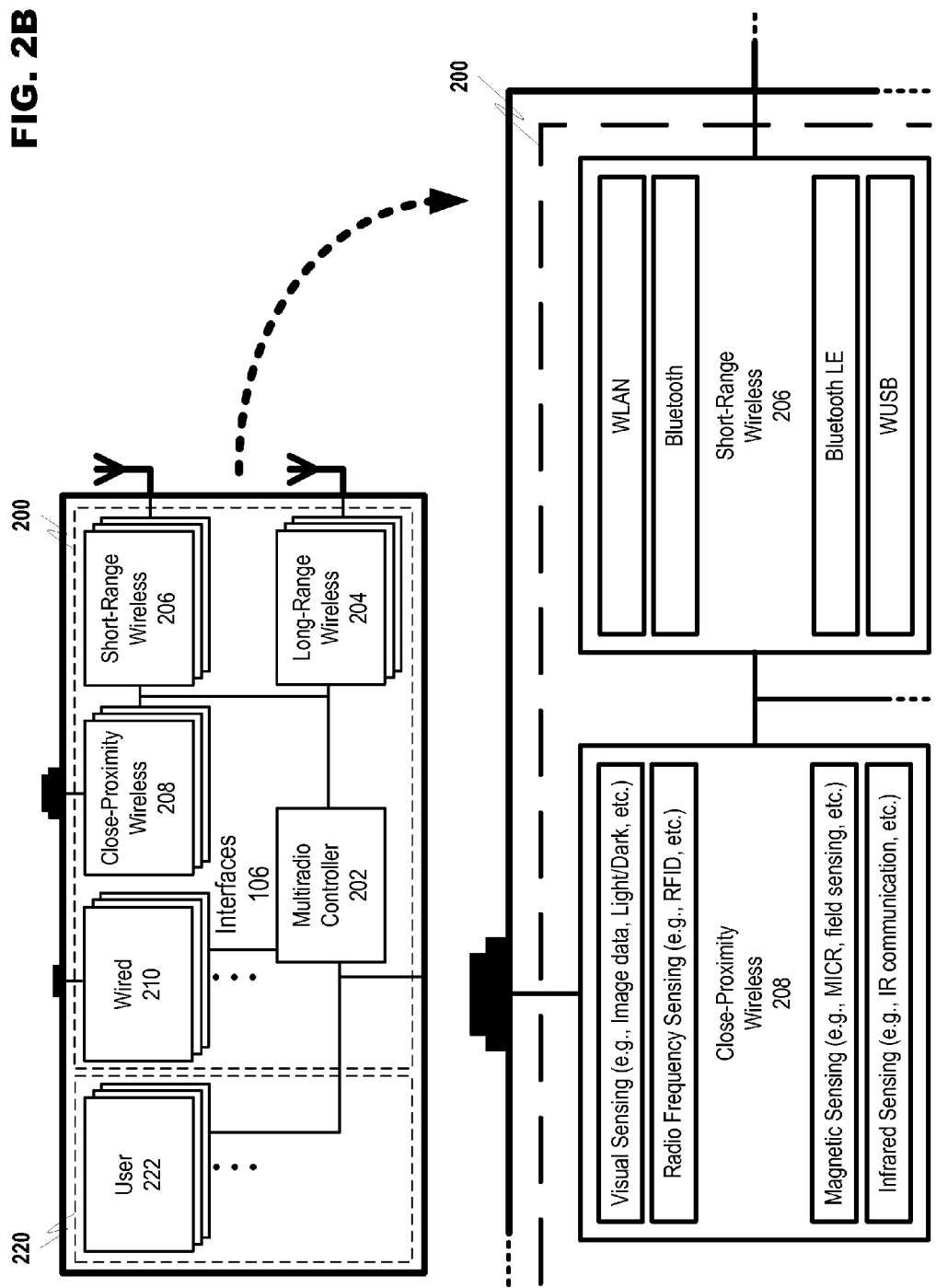
FIG. 2B discloses additional detail with respect to example close proximity and short range wireless resources usable with at least one embodiment of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106, shown with respect to computing device 100 in FIG. 1, is now discussed with respect to FIG. 2A. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2A have been presented only for the sake of explanation herein, and thus, are not intended to limit the various embodiments of the present invention to utilization of any particular interface. Embodiments of the present invention may also utilize interfaces that are not specifically identified in FIG. 2A.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2A.

The example communication interface configuration 106 disclosed in FIG. 2A may, in accordance with at least one embodiment of the present invention, further comprise example close-proximity wireless interfaces 208 such as set forth in FIG. 2B. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth communication, Bluetooth Low Energy communication, wireless Universal Serial Bus (WUSB) communication, etc. These forms of communication may, in various applications, support wireless interaction between two or more handheld wireless communication devices, between a handheld wireless communication device and a stationary access point (AP), to peripheral interface devices, etc.

II. Example Operational Environment

Assisted global positioning (A-GPS) and other electronic positioning solutions based on wireless communication may perform acceptably and may provide extensive coverage in outdoor operational environment where signal quality and number of satellites/base stations are typically very good. This performance may be bolstered by accurate maps featuring terrain features, roads, traffic conditions and other related information have been mapped exhaustively and are constantly maintained from satellite images, aerial photography, feedback from user communities, etc. Together, the available positioning solutions and the feature-rich maps may provide excellent user experiences (e.g., such as in instances including vehicle and pedestrian navigation use).

The situation becomes totally different for indoor operational environments. Known positioning technologies have very limited capabilities indoors, and thus, usually fail. There are many reasons for these failures. Initially, existing positioning/mapping solutions may be expensive and difficult to implement. Map information does not exist for many public/private structures, and the provision of this information requires extensive modeling visualization and/or mapping that is currently only provided by private companies. Further, existing solutions may provide unstable and/or unpredictable performance, which may occur to do external positioning signals being unavailable or unreliable and indoor signals lacking sufficient position resolution.

An example of a proximity-based positioning system usable in indoor operational environments is disclosed in FIG. 3. One or both of apparatus 300 and beacon 302 may include proximity transceivers that may send or receive wireless signals usable for measuring apparatus proximity. For example, beacon 302 may periodically transmit signals receivable by apparatus 300. Upon receiving a signal transmitted from beacon 302, apparatus 300 may at least know that it is within transmission range of beacon 302. However, this is a very rudimentary operation in that the precise position of apparatus 300 may only be narrowed to the broadcast radius of the beacon 302. The signal strength 304 of beacon 302 may be limited so that it only covers a small area, which may increase positioning resolution. However, such a change may be prohibitive as it would necessitate many more beacons 302 in order to cover the full operational environment.

The location estimation for apparatus 300 may be refined by introducing received signal strength (RSS) sensing for signals received from beacon 302. For example, beacon 302 (e.g., an AP in a WLAN network) may transmit signals including AP identification information that can be measured by apparatus 300 (e.g., a mobile device), and based on the RSS measured from several APs 302, mobile device 300 may estimate its location relative to the measured AP locations. A global location reference (e.g., the location of apparatus 300 within the operational environment occupied by one or more apparatuses 302) may then be computed based on operational environment information available from a database mapping the location of each AP 302 within the space. More specifically, after apparatus 300 defines its position with respect to one or more apparatuses 302, and defines the position of apparatuses 302 within the operational environment, apparatus 300 may then extrapolate its position in the operational environment.

However, positioning based on RSS measured at apparatus 300 may suffer from substantial variance in measured RSS values caused by obstacles on the radio propagation path. An example of a problematic situation is providing electronic positioning within a structure such as a building. While positioning within a building will be utilized for the sake of explanation herein, the various embodiments of the present invention are not limited only to implementation in this specific application. Almost any situation wherein traditional positioning techniques do not provide adequate performance (e.g., speed, resolution, etc.) may experience improvement through the following example embodiments and/or implementations of the present invention.

Figure 4:
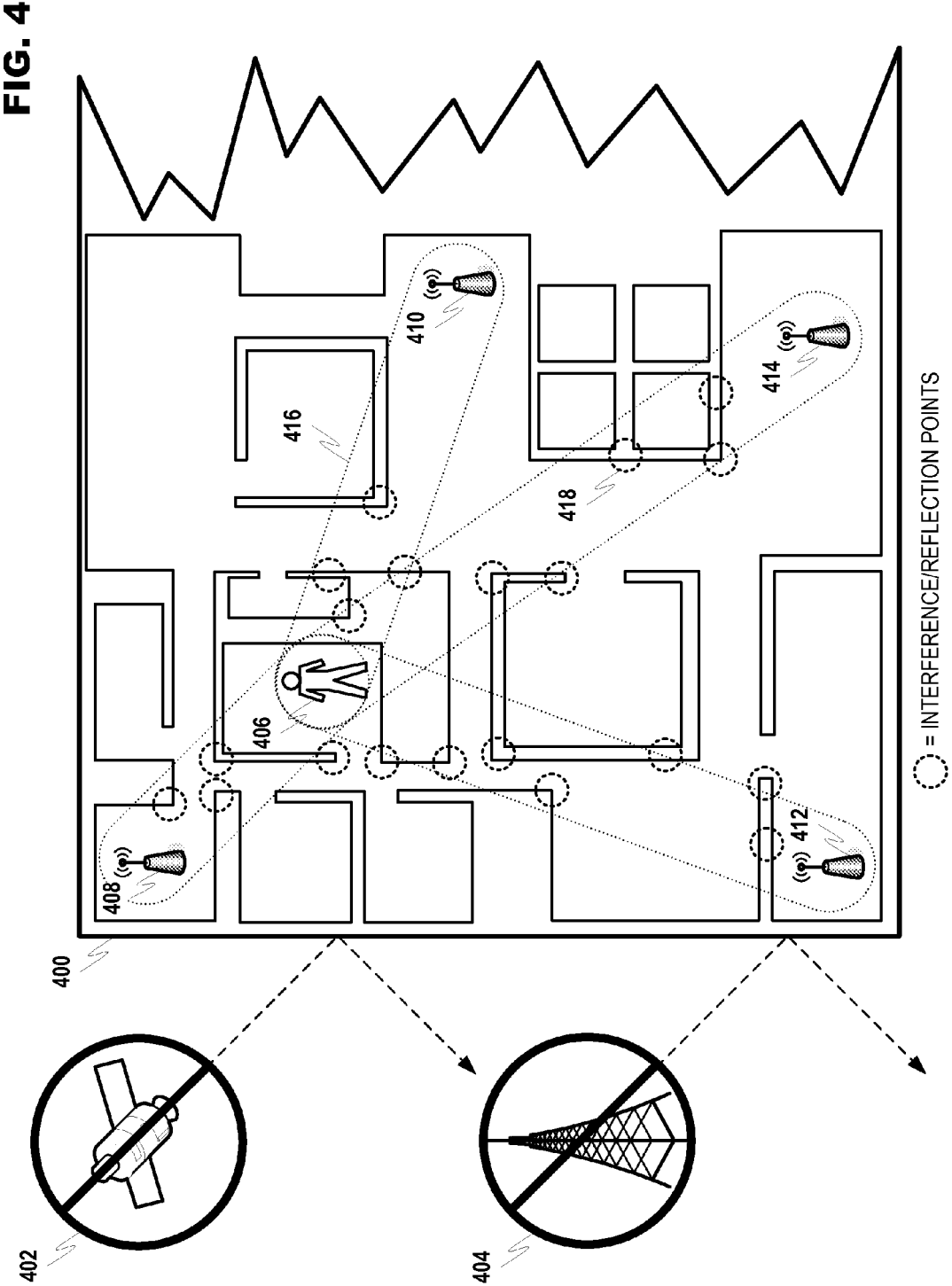
FIG. 4 discloses an example operating scenario in accordance with at least one embodiment of the present invention.

Partial floor plan 400 disclosed in FIG. 4 will help to explain various challenges to traditional electronic positioning that may be experienced within a structure (e.g., building). Information received from satellites 402 may be effective when outside where these signals may be efficiently received. However, structures may present physical obstacles that significantly reflect, or totally block, such signals as shown in FIG. 4. Signals from long-range earth-based networks 404 (e.g., cellular) are receivable inside structures and may be used for communication purposes, but may prove unreliable for use in positioning due to similar sources of interference in a structure (e.g., building) coupled with long distances between the user apparatus and the base station. User 406 may then have to rely on wireless electronic communication provided within a building in order to electronically determine position. For example, APs 408, 410, 412 and 414 may support wireless communication within floor plan 400. In addition to simply providing data communication (e.g., access to LAN or WAN such as the Internet), the signals transmitted from the APs may also be used for positioning. Various methodologies for estimating position may be employed, each with differing amounts of accuracy. For example, connection 416 to a particular AP (e.g., AP 410) indicates that user 406 is within communication range of that AP. However, the resolution provided by such estimation is inexact, especially within the confines of buildings.

Moreover, signals 416 transmitted by AP 408-414 may experience substantial interference and/or reflection from various physical elements 418 within a building or structure. For example, walls containing wiring or metallic conduits, hallways containing various corners and other possibly intrusive objects, metal in elevator shafts, etc. may cause signal interference or reflection 418. Interference/reflection points 418 may result in AP signals 416 being delayed significantly, or not being received at all. Further, these signals may be received from directions that do not indicate the actual direction from which the signal was originally sent, and thus, may cause inaccuracy when employing these traditional position finding techniques.

Fingerprinting is one technique can be used to overcome in-structure positioning problems such as described above. Fingerprinting includes pre-measuring various characteristics (e.g., RSS values for signals transmitted from each AP) at different locations in the operational environment to create location "fingerprints," and storing the fingerprints in a database where they may be used as location references. However, the fingerprinting method does not remove uncertainty caused by unknown effects, such as people moving in the surroundings, user body and/or device orientation, device dependent antenna properties, etc., which all may significantly affect sensed signal strength. One method of mitigating this effect is to create a time-dependent fingerprint database, (e.g., by taking multiple reference measurements at different times of day) and then using data-mining/clustering techniques to find the match. However, these methods are costly, laborious and consume many resources (e.g., processing power, data storage space, etc.).

Another problem is that at distances further away from an AP the signal strength changes very little as function of distance. For the reasons mentioned above, location accuracy in the range of 3-30 meters can be practically achieved based only on RSS measurements, but the highest precision can only be obtained by calibrating out all user effects and devices effects (e.g., by using similar devices with unified and known antenna properties). Direction-finding antennas in WLAN APs have been proposed to improve the location accuracy. By using direction-finding antennas location accuracy can be improved to less than one meter even without fingerprinting. An example indoor positioning system may be based on ceiling mounted directional positioning beacons and mobile devices may resolve location based on receiving specific positioning packets from the beacons.

III. Example Directional Information

Figure 5:
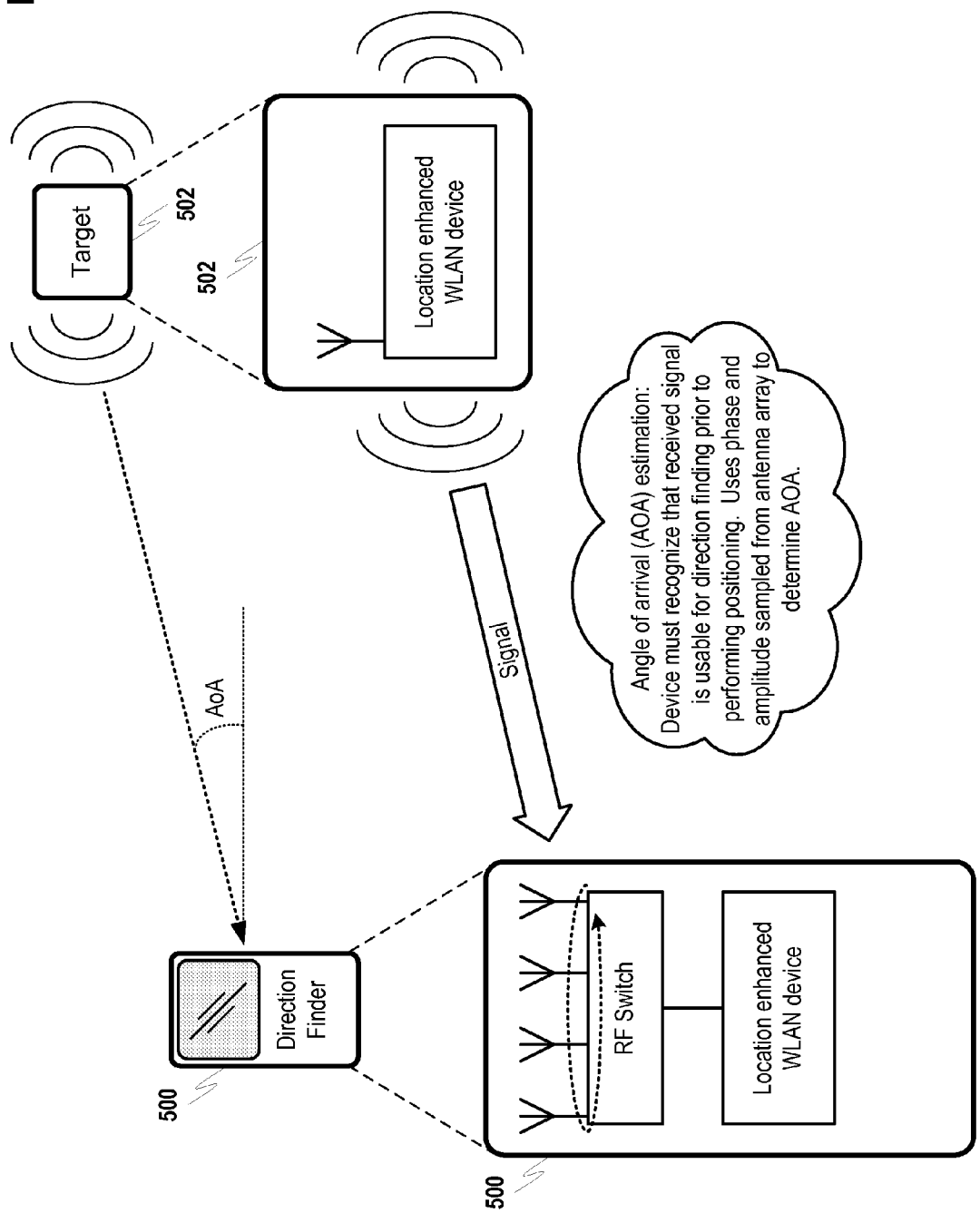
FIG. 5 discloses an example of positioning based on Angle of Arrival (AoA) information in accordance with at least one embodiment of the present invention.
Figure 6:
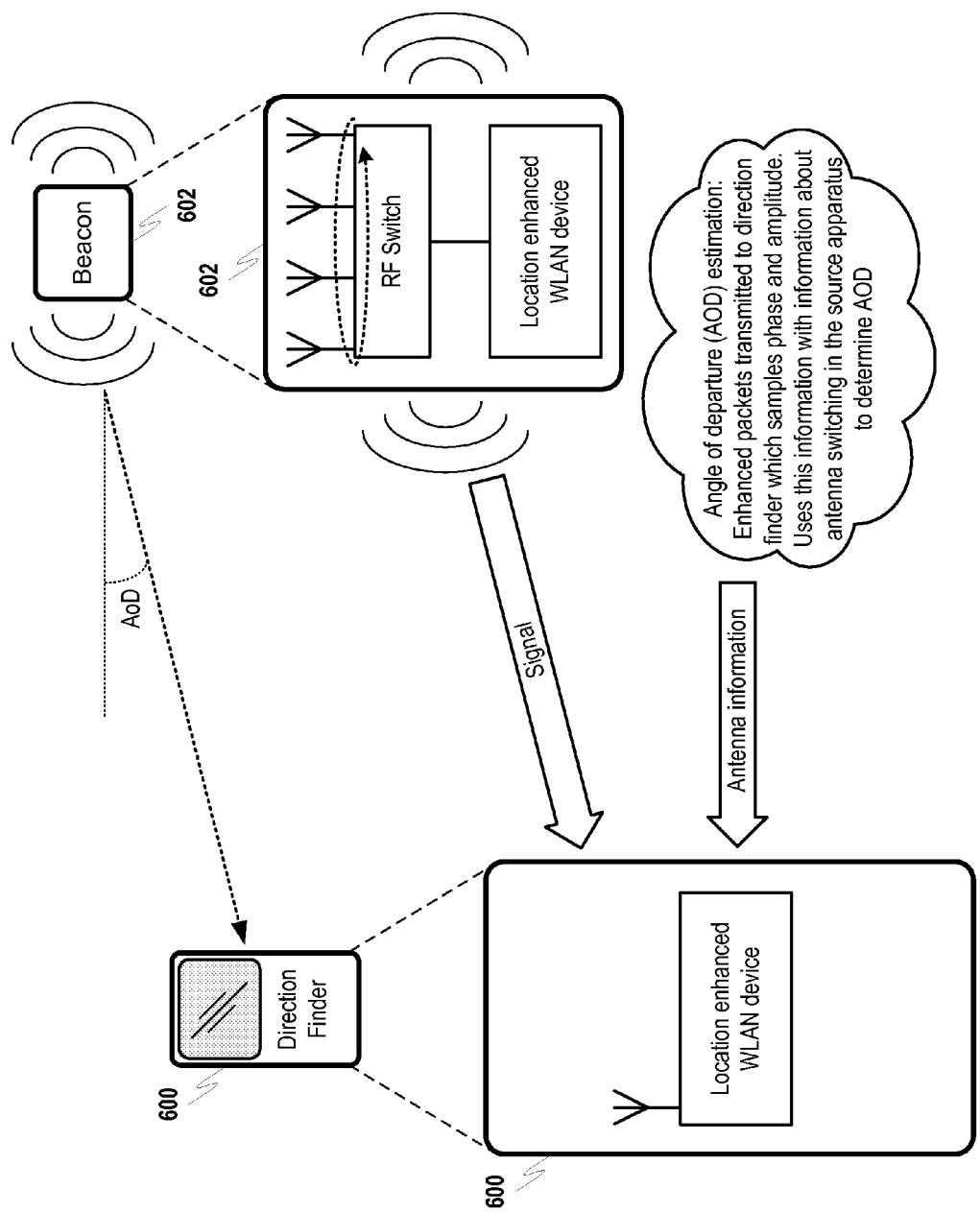
FIG. 6 discloses an example of positioning based on Angle of Departure (AoD) information in accordance with at least one embodiment of the present invention.

FIGS. 5 and 6 disclose two examples of electronic direction-finding that may be implemented in apparatuses. For the sake of explanation in these figures, it is assumed that the disclosed apparatuses may communicate using WLAN. While various embodiments of the present invention will be described as using WLAN, the use of this communication medium is not intended to limit the present invention. On the contrary, it is conceivable that the various embodiments of the present invention may be implemented using alternative wireless mediums.

FIG. 5 discloses an example wherein apparatus 500 estimates an angle-of-arrival (AoA) of a communication signal received from apparatus 502. In the course of the estimation, various amplitude and phase samples for the received signal may be measured at each antenna in an antenna array residing in apparatus 500. The amplitude and phase measurements may be recorded by cycling an RF switch through each antenna in the antenna array. Apparatus 500 may then estimate an AoA for the signal using the recorded samples and parameters related to the antenna array. Antenna array parameters pertaining to the antenna array type and antenna pattern may be set in the device, for example, as part of the apparatus manufacturing process. As further set forth in FIG. 5, apparatus 500 must be able to identify that a signal is usable for performing AoA estimation prior to initiating the process. The usability of a signal may depend on apparatus 500 knowing what signal content to measure, including at least the length of the signal content to measure and possibility even a bit pattern contained in the signal content.

FIG. 6 shows an example of apparatus 600 performing angle-of-departure (AoD) estimation for a signal transmitted from apparatus 602. In such a configuration, apparatus 602 may transmit AoD enhanced packets and may execute antenna switching during the transmission of the packet. Apparatus 600 may scan for AoD enhanced packets and may execute amplitude and phase sampling during reception of these packets. Apparatus 600 may then utilize the amplitude and phase samples, along with antenna array parameter information, to estimate the AoD of the packet from apparatus 602. In accordance with at least one embodiment of the present invention, some of the fixed parameters related to the physical configuration of the antenna array in apparatus 602 may be obtained from a remote resource, such via a wired or wireless link to the Internet. Again, while the positioning methodology disclosed in FIG. 6 allows for positioning estimation in an apparatus that may not contain specialized positioning hardware, apparatus 600 must still be aware that the packets in the signal being transmitted by apparatus 206 are AoD enhanced packets prior to initiating AoD estimation processes.

IV. Example Positioning within a Network

There are at least two architectures that may be employed in accordance with the various embodiments of the present invention: Network-centric positioning and mobile-centric positioning. The main difference between these two architectures is in the entity or "calculator" that processes the raw data in estimating the position of the target. Network-centric architecture relies on a remote entity (e.g., a server) to take on some or all of the processing burden involved with estimating the position of the target apparatus, while mobile-centric systems delegate some or all of the processing to a mobile apparatus, such as the apparatus that requested the estimated position and will display the estimated position to the user. It is important to note that while the examples discussed in this disclosure demonstrate an apparatus transmitting signals in order to learn its own location (e.g., self-positioning), this is but one example application of the various embodiments of the present invention. It is also possible for apparatuses to seek the position of other apparatuses. For example, a key fob may comprise circuitry capable of transmitting signals for positioning, and for another apparatus to locate the key fob based on these transmissions.

Figure 7:
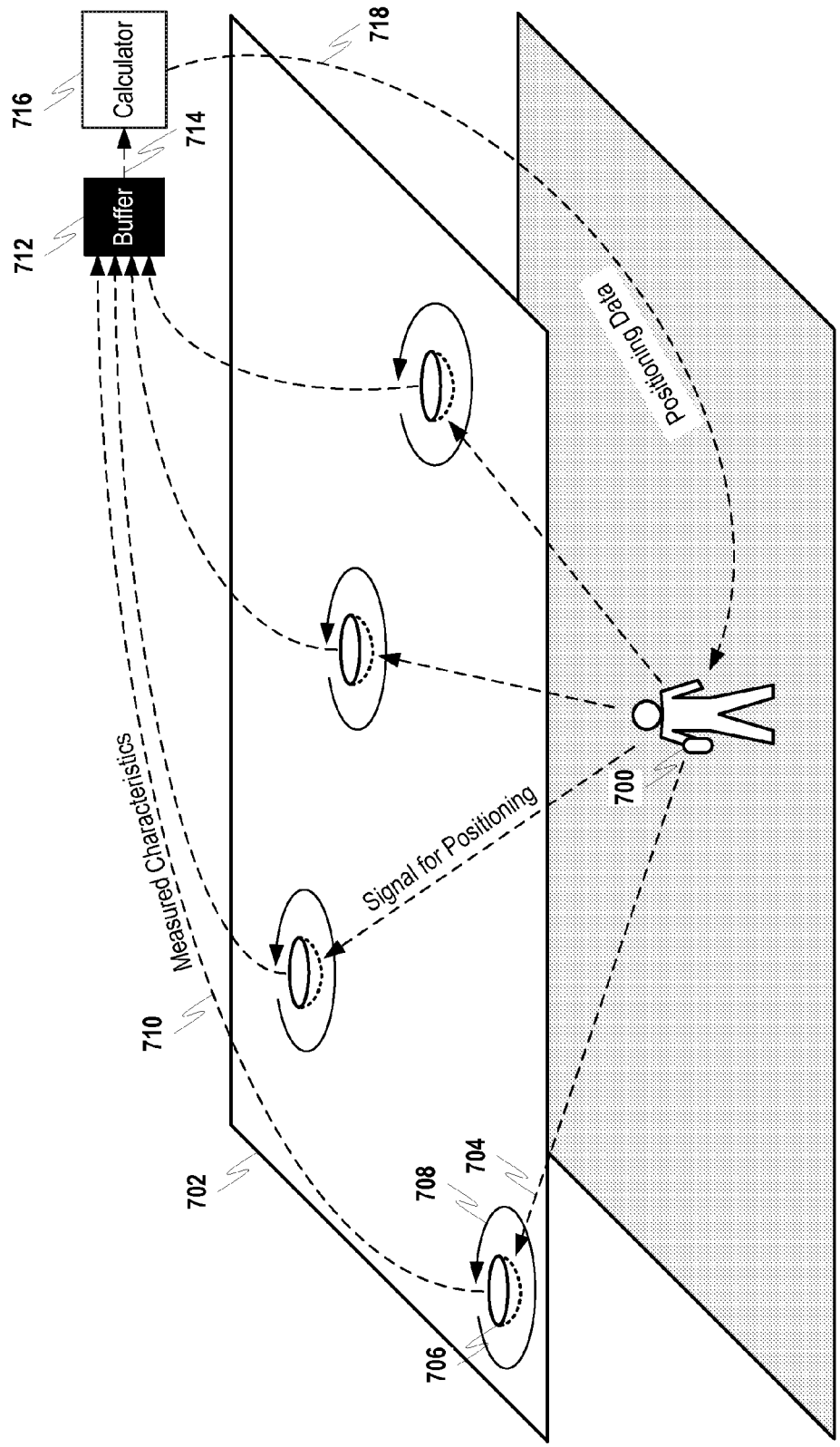
FIG. 7 discloses an example of a positioning system comprising a remote apparatus as a calculator in accordance with at least one embodiment of the present invention.

As shown in the example of FIG. 7, Network-centric positioning may be based on AoA and/or AoD information being collected and at least partially processed by a remote entity, such as a server, that has connectivity to directional transceivers. User 700 (e.g., possessing an apparatus enabled to communicate wirelessly such as described at 100 in FIG. 1-2B) may be in operational environment 702 (e.g., inside a building). The apparatus of user 700 may transmit signals for positioning 704 that may be received by various directional transceivers (DTs) 706, (e.g., access points) in operational environment 702. DTs 706 may be situated on ceilings inside a building as shown in FIG. 7, or in various other locations such as in/on walls, floors, furniture, etc. Antennas within antenna arrays in each DT 706 may be selected as shown at 708 (e.g., via RF switches such as disclosed in FIG. 5-6) in order to measure characteristics such as phase and amplitude associated with received signals for positioning 704 during AoA or AoD estimation.

In accordance with at least one embodiment of the present invention, DTs 704 may then provide measured characteristics to buffer 712 via wired or wireless transmission 710. The necessity of buffer 712 depends on the localization method being employed. For example, AoA or AoD estimation may provide the direction of transmission or reception corresponding to a signal, but may not be able to accurately estimate position based on measurements provided by only one DT 706. On the other hand, characteristics associated with a certain signal measured by multiple DTs 706 may provide varied perspectives from which the position of an apparatus may be accurately estimated (e.g., triangulated). While characteristics measured from different DTs 706 may be available, this information may not be available at the same time in instances where, for example, DTs 706 are situated relatively far apart, operational environment 702 is busy with many apparatuses to be positioned, etc. In such instances buffer 712 may act to temporarily store the characteristics associated with certain signals for positioning, but measured by different DTs 706, prior to presentation to calculator (e.g., server) 716 via wired or wireless transmission 714. Calculator 716 may then process the characteristics measured by various DTs 706 associated with each signal for positioning 704 in order to generate positioning data that may be forwarded via wired or wireless transmission 718. Positioning data may estimate the position of the source of signal for positioning 704, which in FIG. 7 is apparatus 700 during self-positioning. Positioning information may comprise, for example, absolute or relative coordinate data that is usable by apparatuses for displaying location (e.g., relative to a map), route planning, etc.

Figure 8:
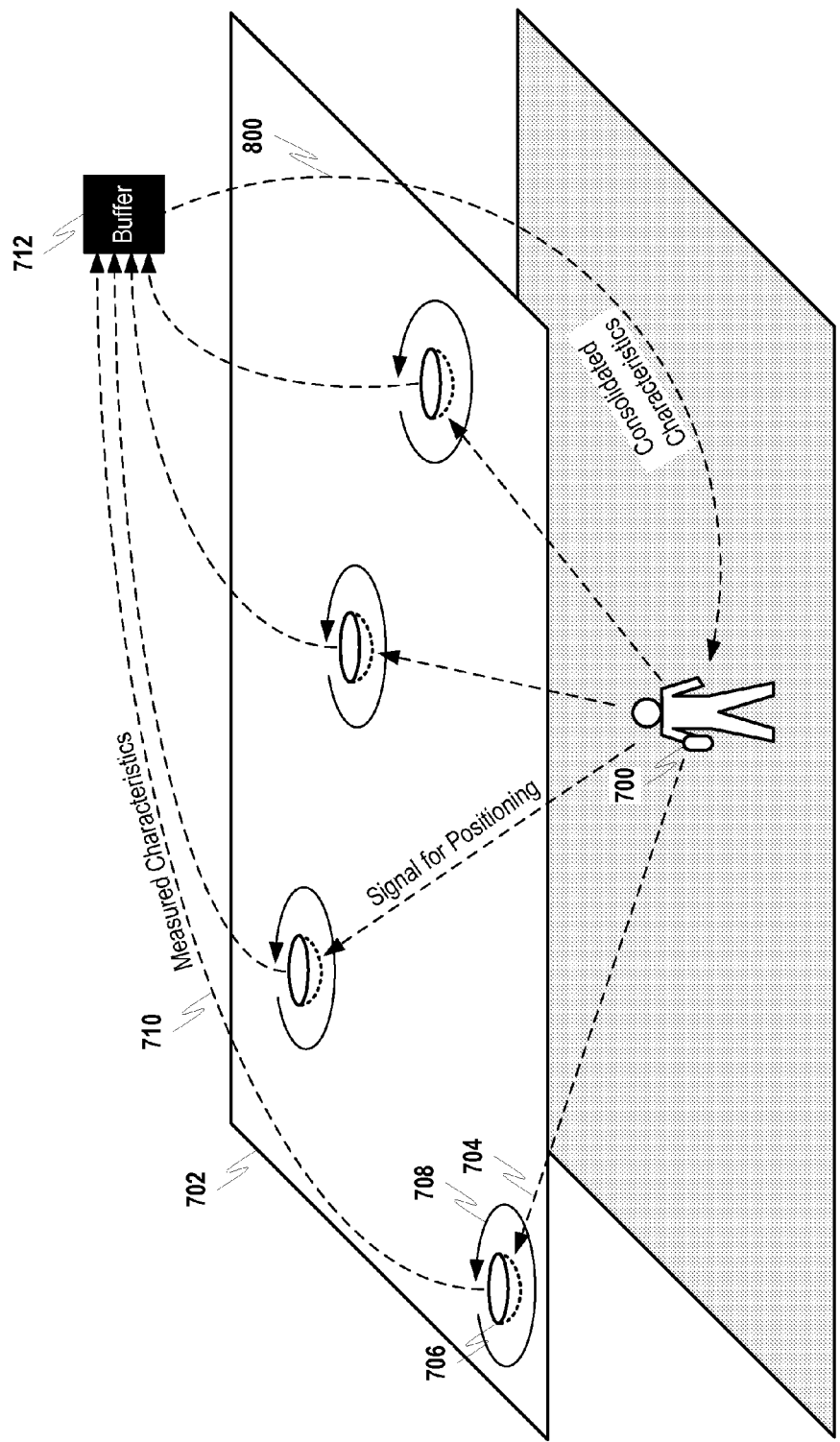
FIG. 8 discloses an example of a positioning system comprising a mobile apparatus as a calculator in accordance with at least one embodiment of the present invention.

FIG. 8 discloses an example mobile-centric positioning architecture. Many of the structures disclosed in FIG. 8 are similar to FIG. 7, with at least one difference being that there is no remote calculator 716. In FIG. 8 the apparatus of user 700 may comprise hardware/software that allows it to act as the calculator. Buffer 712 may consolidate characteristic measurements from various DTs 706, as shown at 710, prior to forwarding this information to a mobile device (e.g., to the apparatus of user 700 via wired or wireless transmission 800). In this scenario the apparatus of user 700 may act as a calculator and process the consolidated measured characteristic information in order to estimate the location of the apparatus that transmitting signal for positioning 704. In the example of FIG. 8 this is also the apparatus of user 700 as self-positioning is being depicted. It is also possible for the apparatus that transmitted signal for positioning 704 to be different from the apparatus that eventually communicates the calculated positioning information to user 700. In an example situation the different apparatus may be associated with an item to be located, such as a set of keys that is associated with key fob containing circuitry for transmitting signal for positioning 704. The apparatus of user 700 may then be used to locate the set of keys/fob.

V. Example Positioning Architectures without Buffering

At least one issue existing in both network-centric and mobile-centric positioning architectures is the reliance on a buffer for consolidating characteristic information measured by various DTs 706. In practice, each DT 706 may measure characteristics associated with a signal for positioning 704, and to calculate the location of the source we need measured characteristics from all the DTs 706. Both systems therefore necessitate buffer 712 to gather data from all DTs 706 and to distribute the data to calculators that estimate the positions of the source apparatuses. Aside from the substantial bottleneck created by requiring all data from DTs 706 to be routed through buffer 712, these activities also consume processor time, network bandwidth, etc.

In accordance with at least one embodiment of the present invention, calculator identifier information, such as an IP address and optionally a port identifier, may be included in packets transmitted by apparatuses to be positioned (e.g., within signals for positioning 704). Any DT 706 that receives a signal for positioning 704 that also comprises these packets may then send the characteristics they measure (e.g., amplitude and phase samples) directly to a calculator.

The inclusion of calculator identifier information in a signal for positioning 704 allows the calculator to receive measured characteristic information without having to rely upon buffer 712, which may still be utilized when no calculator identifier information is present in the packet. Alternatively, calculator identifier information may be transmitted in separate packets intended just for configuring DTs 706 (e.g., this could be transmitted much more seldom than signals for positioning 704), however, a possible issue in this alternate approach is that DTs 706 would need to store the calculator identifier information internally and then possibly connect the calculator identifier information for a particular calculator (e.g., the apparatus of user 700) with particular signals for positioning 704 (e.g., signals for positioning transmitted by the apparatus of user 700, for example, during a self-positioning process).

Figure 9A:
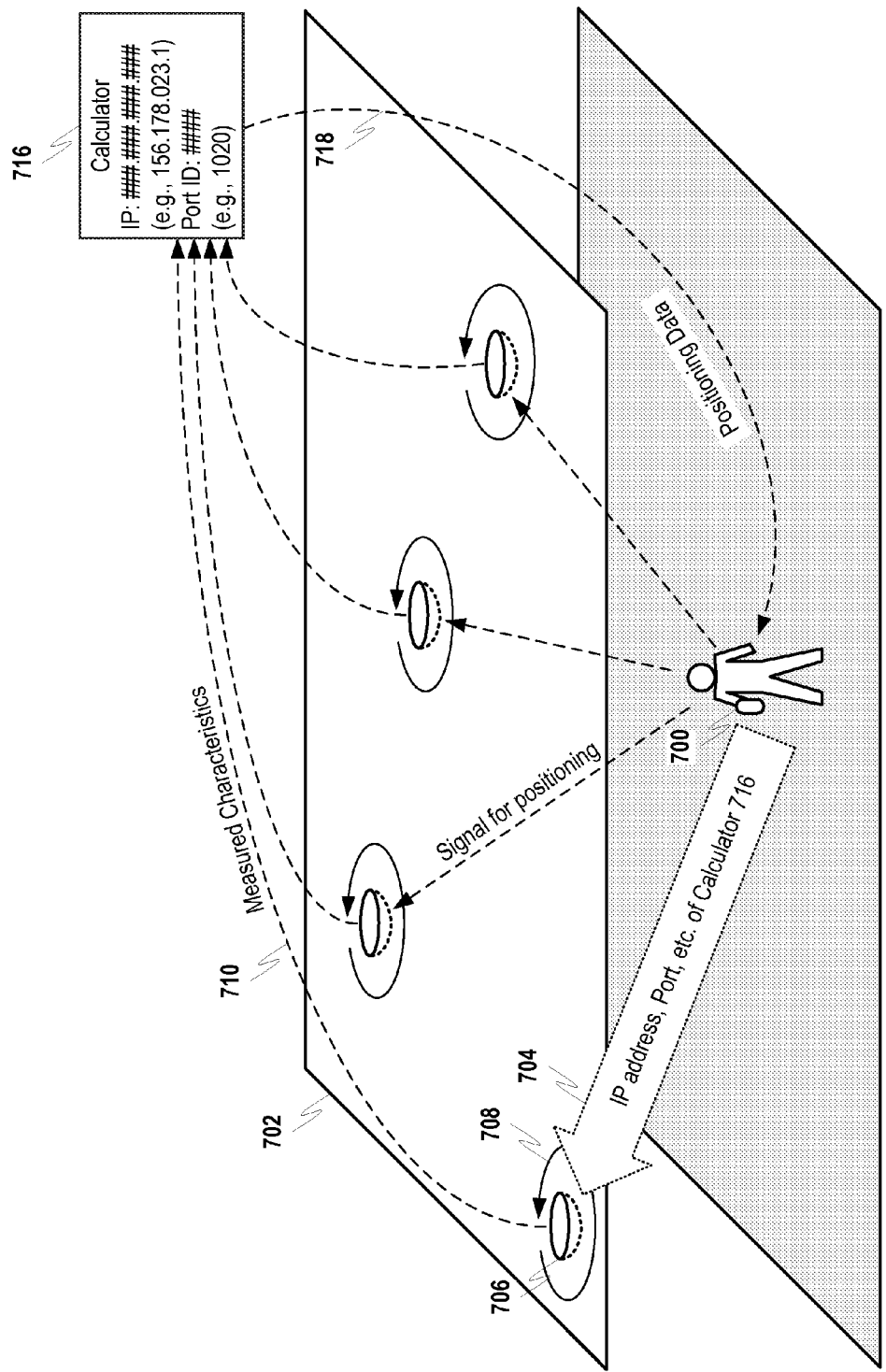
FIG. 9A discloses an example of a positioning system comprising direct routing to a remote calculator in accordance with at least one embodiment of the present invention.

An example implementation for a network-centric system, in accordance with at least one embodiment of the present invention, is disclosed in FIG. 9A. Signal for positioning 704 now comprises calculator identifier information comprising, for example, an IP address and port identifier corresponding to calculator 716. While in calculator 716 an example IP address format is shown as ###.###.###.### (e.g., 156.178.023.1) and an example port identifier format is shown as #### (e.g., 1020), these formats may change depending on the particular manner of implementation. For example, the most commonly used and best known port identifiers are those numbered 0 to 1023, which are dedicated for Internet use, but they can extend far higher for specialized purposes. In FIG. 9A calculator 716 may be a server that is coupled via wired or wireless communication to DTs 706. After each DT 706 scans signal for positioning 704 (e.g., as shown at 708), the calculator identifier information contained in signal for positioning 704 to transmit the measure characteristic information directly to calculator 716. Calculator 716, upon receipt of the measured characteristic information transmissions 710, may then process the measured characteristic information in order to create positioning information, which is then transmitted to the apparatus of user 700, as shown by transmission 718, for presentation of the location of the target apparatus (e.g., that first sent the signal for positioning 704) to the user. Presentation may take the form of displaying the location of the target apparatus as coordinates, with respect to a map, as a relative direction towards the target apparatus, as a route to the target apparatus, etc. In the example of FIG. 9A the apparatus that sent signal for positioning 704 and requesting apparatus are the same since an example self-positioning process is being disclosed.

Figure 9B:
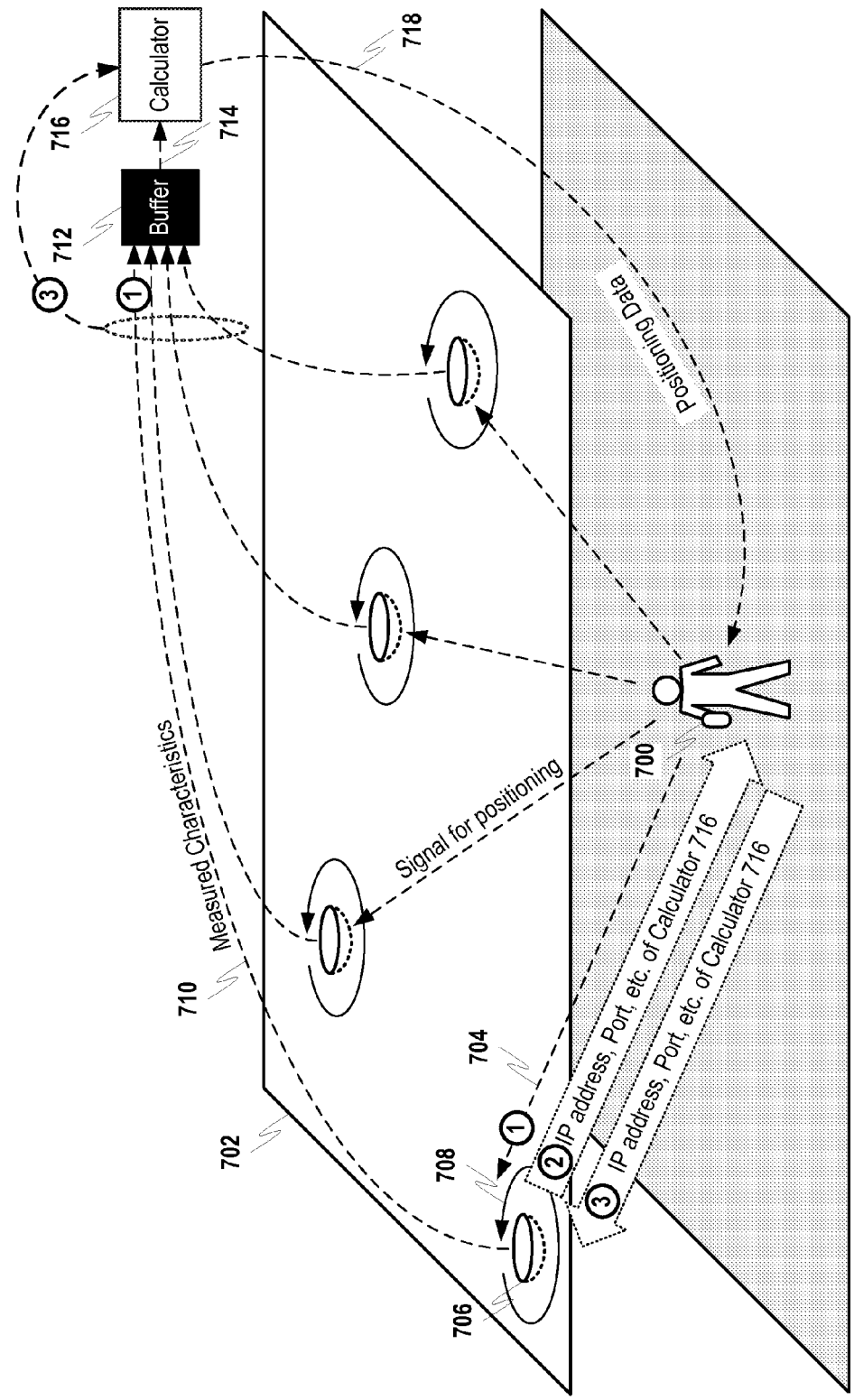
FIG. 9B discloses an example of a positioning system comprising a subsequent direct routing to a remote calculator in accordance with at least one embodiment of the present invention.

It may also be possible for apparatuses that transmit signals for positioning 704 to obtain calculator identifier information as shown in FIG. 9B. The localization system may begin operation normally (e.g., with use of buffer 712) as shown at ①. A DT 706 near the location of the apparatus transmitting signals for positioning 704 may then inform the transmitting apparatus of calculator identifier information as shown at ②. The transmitting apparatus may then transmit the calculator identifier information in the signals for positioning 704 (e.g., for a set time such as an hour) so that the data 710 from all DTs 706 related to that tag go directly to calculator 716 as shown at ③, bypassing the buffer. In this way the load on buffer 712 may be reduced while also reducing the latency in tracking as the data from DTs 706 goes directly to calculator 716 instead of via buffer 712, which may be useful when fast response is required. In accordance with at least one embodiment of the present invention, an alternative configuration may include each DT 706 having a list of target apparatuses (e.g., apparatuses that transmit signals for positioning 704) along with a corresponding calculator 716 for forwarding measured characteristics as shown at 710. However, this alternative configuration requires that each DT 706 have logic and memory for maintaining and updating the list of target apparatuses and corresponding calculators.

Figure 10:
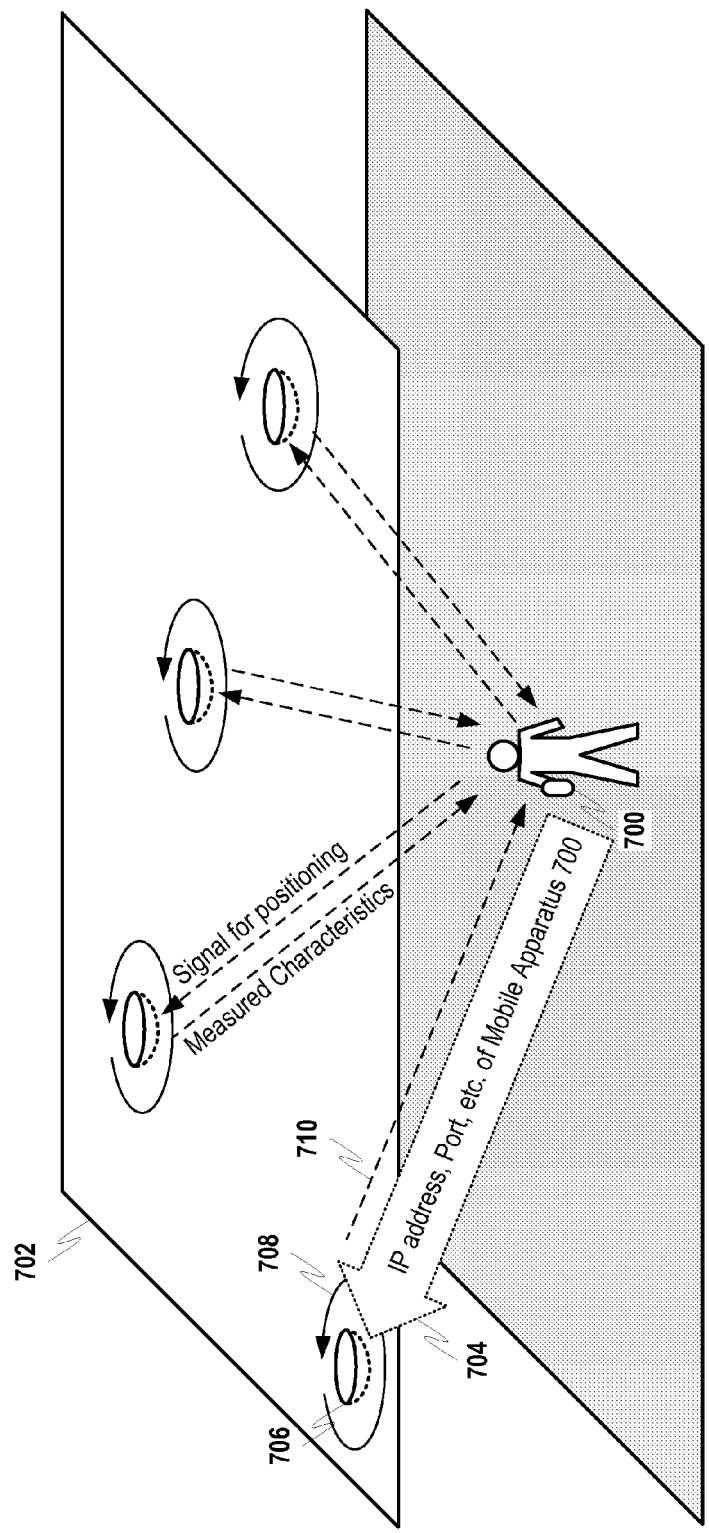
FIG. 10 discloses an example of a positioning system comprising direct routing to a mobile calculator in accordance with at least one embodiment of the present invention.

An example of mobile-centric architecture configured in accordance with at least one embodiment of the present invention is disclosed in FIG. 10. In case of mobile-centric asset tracking, if not performing self-positioning the mobile apparatus (e.g., the apparatus of user 700) may inform the target apparatus (e.g., the apparatus transmitting signal for positioning 704) of its IP address (e.g., via a wireless communication medium like Bluetooth Low Energy). DTs 706 may then receive signals for positioning 704 from the target apparatus, and may transmit the measured characteristics (e.g., amplitude and phase measurements) directly to the calculator (e.g., the apparatus of user 700) via wired or wireless Internet connection as shown in FIG. 10.

In mobile-centric systems it may be possible for calculator identifier information (e.g., an IP address) of the mobile apparatus to change while the tag is still being tracked due to, for example, changing from 3-G to Wi-Fi, etc. This behavior may be addressed in a variety of ways. For example, it would not be a problem if the mobile apparatus transmitting the signals for positioning 704 was performing self-positioning since the mobile apparatus may update the IP address it is transmitting any time. In instances where self-positioning is not occurring (e.g., another apparatus is being tracked) the phone number of the calculator may be transmitted in the packets for positioning 704 instead of an IP address. This operation would still require an entity (e.g., remote server) to convert the Ethernet traffic from DTs 706 to something oriented to the phone number of the mobile device, like short messaging service (SMS). Alternatively if DTs 706 employ Transmission Control Protocol (TCP) instead of User Datagram Protocol (UDP) to convey the measured characteristics, then confirmation of whether the destination (e.g., the calculator) was reached or not, and possibly some failsafe operation, may be implemented. In another example scenario, the calculator (e.g., the apparatus of user 700) may occasionally (e.g., after every tenth packet) reply to measured characteristic transmissions 710 received from DTs 706 (e.g., using UDP) to inform DTs 706 that the transmissions were received.

The various embodiments of the present invention may also incorporate backup provisions in case a connection is lost. For example, a backup server may be implemented where some or all of the packets sent as part of measured characteristic transmissions 710 may be sent. The mobile apparatus, acting as a calculator, may be able to retrieve these packets if they were not received during normal operation. Alternatively when the mobile apparatus becomes aware that transmission are not being received, a UDP message may be transmitted to the last DT 706 (e.g., the sender IP address can be retrieved from the packet) advising that the connection was lost and also providing the mobile apparatuses updated calculator identifier information. The DT 706 may then instruct the target apparatus (e.g., that is transmitting signals for positioning 704) to update its calculator identifier information accordingly. While such operation does not require a third party intermediary like a server, issues may arise if the target apparatus moves out of range of DT 706, which may be accommodated by transmitting the instruction utilizing a higher power signal. Alternatively, DTs 706 may include a system-level IP address in the measured characteristic transmission 710. The calculator (e.g., a mobile device) may transmit updated identifier information (e.g., an IP address) to the system-level IP address so that all deployed DTs 706 can instruct nearby target apparatuses to update their calculator identifier information. An intermediary entity (e.g., a server) may be needed to employ this safeguard, but the operation and implementation of this system would still be much simpler than the former buffer operation.

Figure 11:
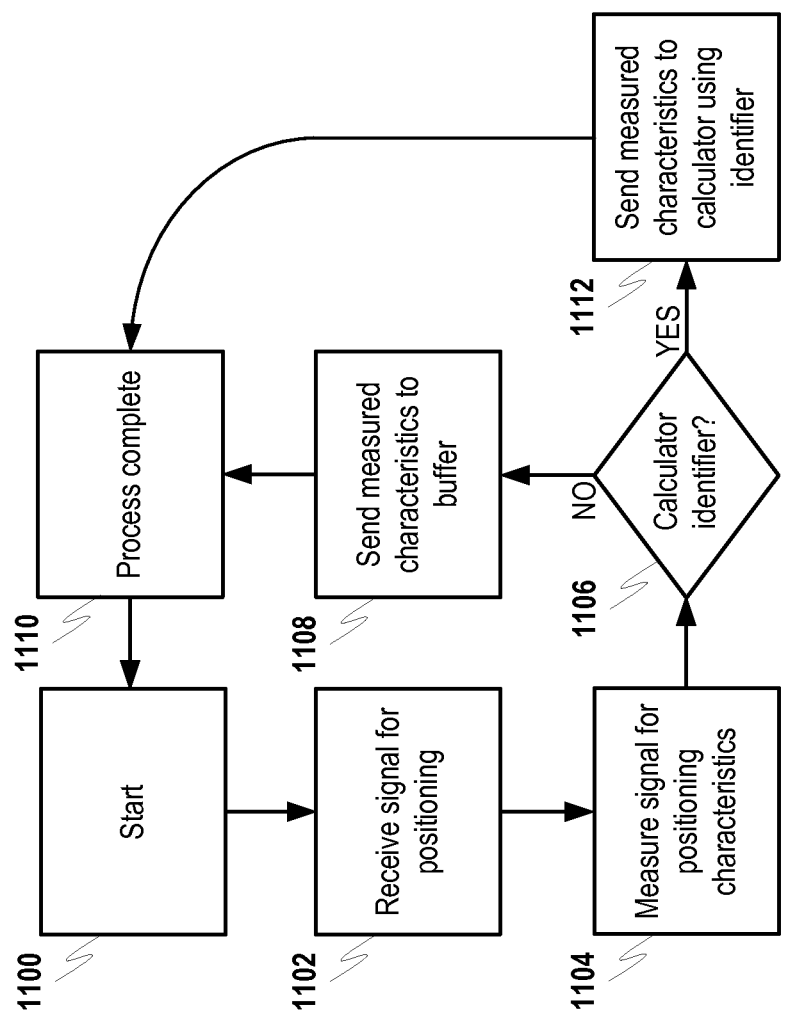
FIG. 11 discloses a flowchart for an example positioning process from the perspective of a directional transceiver in accordance with at least one embodiment of the present invention.

In accordance with at least one embodiment of the present invention, a flowchart of an example process from the perspective of a directional transceiver is disclosed in FIG. 11. The process may start in step 1100 and may move to step 1102 wherein a signal for positioning may be received. The directional transceiver may then measure characteristics associated with the received signal for positioning in step 1104. The measured characteristics may comprise, for example, phase and amplitude associated with the received signal as measured on antennas in an antenna array in the directional transceiver. The process may then move to step 1106 wherein a determination may be made as to whether the received signal for positioning includes calculator identifier information. Example calculator identifier information may comprise an IP address and/or a port identifier for a calculator. If it is determined in step 1106 that the received signals does not include calculator identifier information, then in step 1108 the directional transceiver may transmit the measured characteristics to a buffer. The process may then be complete in step 1110 and may reinitiate in step 1110 in preparation for the next received signal for positioning.

If in step 1106 it is determined that the received signal for positioning includes calculator identifier information, the process may proceed to step 1112 where the directional transceiver may transmit the measured characteristics to a calculator using the calculator identifier information. For example, the directional transceiver may transmit the measured characteristics to an IP address included in the calculator identifier information via wired or wireless communication. The process may then again be complete in step 1110 and may reinitiate in step 1100 in preparation for the next received signal for positioning.

Figure 12:
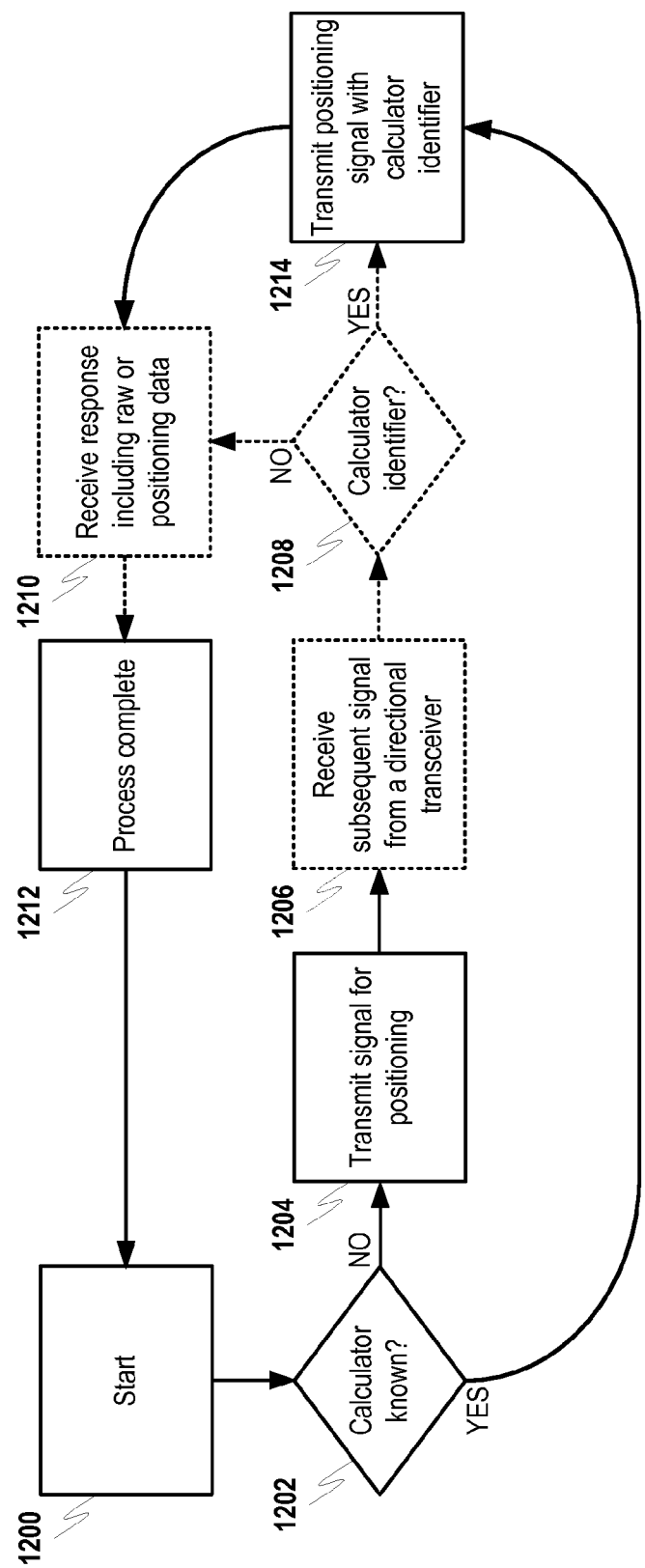
FIG. 12 discloses a flowchart for an example positioning process from the perspective of an apparatus transmitting signals for positioning in accordance with at least one embodiment of the present invention.

In accordance with at least one embodiment of the present invention, a flowchart of an example process from the perspective of an apparatus configured to transmit signals for positioning is disclosed in FIG. 12. The process may initiate in step 1200 and may proceed to step 1202 where a determination may be made as to whether calculator identifier information is known in the apparatus. If it is determined that no calculator identifier information is known in the apparatus, then in step 1204 a signal for positioning without calculator identifier information may be transmitted from the apparatus.

Steps 1206-1210 represent an optional process that may occur in accordance with at least one embodiment of the present invention. In step 1206 a signal may be received in the apparatus from a directional transceiver. A determination may then be made in step 1208 as to whether the signal received from the directional transceiver includes calculator identifier information. If it is determined that the signal does not include calculator identifier information, the process may proceed to step 1210 where a response to the initial transmission of the signal for positioning may be received in the apparatus. The receipt of a response as set forth in step 1210 may occur where the apparatus is performing self-positioning, and thus, is transmitting the signal for positioning so that it may obtain its own location. The response may comprise raw information (e.g., measured characteristics) if the apparatus is also acting as a calculator, or may include processed positioning information if the apparatus is merely representing its position to the user (e.g., displaying coordinates, representing position on a map, displaying navigation information, etc.). The process may then be complete in step 1212 and reinitiate in step 1200.

If in step 1208 a determination is made that the signal received in step 1206 from the directional transceiver includes calculator identifier information, the process may proceed to step 1214 wherein the apparatus may modify future signals to include the calculator identifier information. The process may then move to step 1210 and proceed as previously described. Returning to step 1202, if a determination is made that the apparatus is aware of the calculator identifier information prior to the transmission of any signals for positioning, the process may proceed directly to step 1214 so that the signals for positioning may be transmitted including the calculator identifier information. The process may then return to step 1210 as described above.

While various exemplary configurations of the present invention have been disclosed above, the present invention is not strictly limited to the previous embodiments.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

The invention claimed is:

1. A method, comprising:
a directional transceiver performing:
receiving a signal for positioning;
measuring at least amplitude and phase characteristics associated with the received signal;
determining if the received signal comprises calculator identifier information, wherein the calculator identifier information identifies a calculator that is configured to estimate the location of an apparatus that transmitted the signal for positioning and wherein the calculator identifier information comprises at least one of an Internet Protocol (IP) address or a port identifier corresponding to the calculator;
when the received signal is determined to comprise calculator identifier information, forwarding the measured characteristics based on the calculator identifier information; and
when the received signal is determined not to comprise calculator identifier information, forwarding the measured characteristics to a buffer.

2. The method of claim 1, wherein the directional transceiver forwards the measured characteristics to a calculator residing at the IP address via an Internet connection.

3. The method of claim 2, wherein the measured characteristics are forwarded to the calculator for estimating a position of an apparatus that transmitted the received signal for positioning.

4. The method of claim 1, wherein the calculator identifier information comprises the IP address of at least one of
 a) a remote server, or
 b) a mobile apparatus, or
 c) the IP address of an apparatus that transmitted the received signal for positioning.

5. The method of claim 1, further comprising:
determining one of an angle of arrival or an angle of departure of the received signal.

6. The method of claim 1, wherein the directional transceiver forwards the measured characteristics to a port identifier corresponding to a calculator.

7. The method of claim 1, wherein the directional transceiver is located indoors.

8. A computer program product comprising computer executable program code recorded on a non-transitory computer readable storage medium, the computer executable program code comprising:
code configured to cause a directional transceiver to receive a signal for positioning;
code configured to cause the directional transceiver to measure amplitude and phase characteristics associated with the received signal;
code configured to cause the directional transceiver to determine if the received signal comprises calculator identifier information, wherein the calculator identifier information identifies a calculator that is configured to estimate the location of an apparatus that transmitted the signal for positioning and wherein the calculator identifier information comprises at least one of an Internet Protocol (IP) address or a port identifier corresponding to the calculator;
code configured to cause the directional transceiver to, when the received signal is determined to comprise calculator identifier information, forward the measured characteristics based on the calculator identifier information; and
code configured to cause the directional transceiver to, when the received signal is determined not to comprise calculator identifier information, forward the measured characteristics to a buffer.

9. The computer program product of claim 8, wherein the code is configured to cause the directional transceiver to forward the measured characteristics to a calculator residing at the IP address via an Internet connection.

10. The computer program product of claim 9, wherein the code is configured to cause the directional transceiver to forward the measured characteristics to the calculator for estimating a position of an apparatus that transmitted the received signal for positioning.

11. The computer program product of claim 8, wherein the calculator identifier information comprises the IP address of at least one of
a) a remote server, or
b) a mobile apparatus, or
c) the IP address of an apparatus that transmitted the received signal for positioning.

12. The computer program product of claim 8, further comprising:
code configured to cause the directional transceiver to determine one of an angle of arrival or an angle of departure of the received signal.

13. The computer program product of claim 8, wherein the code is configured to cause the directional transceiver to forward the measured characteristics to a port identifier corresponding to a calculator.

14. The computer program product of claim 8, wherein the directional transceiver is located indoors.

15. An apparatus, comprising:
at least one processor; and
at least one memory including executable instructions, the at least one memory and the executable instructions being configured to, in cooperation with the at least one processor, cause the apparatus to perform at least the following:
receive a signal for positioning;
measure at least amplitude and phase characteristics associated with the received signal;
determine if the received signal comprises calculator identifier information, wherein the calculator identifier information identifies a calculator that is configured to estimate the location of an apparatus that transmitted the signal for positioning and wherein the calculator identifier information comprises at least one of an Internet Protocol (IP) address or a port identifier corresponding to a calculator;
when the received signal is determined to comprise calculator identifier information, forward the measured characteristics based on the calculator identifier information; and
when the received signal is determined not to comprise calculator identifier information, forward the measured characteristics to a buffer.

16. The apparatus of claim 15, wherein the at least one memory and the executable instructions are configured to, in cooperation with the at least one processor, cause the apparatus to forward the measured characteristics to a calculator residing at the IP address via an Internet connection.

17. The apparatus of claim 16, wherein the at least one memory and the executable instructions are configured to, in cooperation with the at least one processor, cause the apparatus to forward the measured characteristics to the calculator for estimating a position of an apparatus that transmitted the received signal for positioning.

18. The apparatus of claim 15, wherein the identifier information comprises the IP address of at least one of
a) a remote server, or
b) a mobile apparatus or
c) comprises the IP address of an apparatus that transmitted the received signal for positioning.

19. The apparatus of claim 15, wherein the at least one memory and the executable instructions are configured to, in cooperation with the at least one processor, cause the apparatus to determine one of an angle of arrival or an angle of departure of the received signal.

20. The apparatus of claim 15, wherein the at least one memory and the executable instructions are configured to, in cooperation with the at least one processor, cause the apparatus to forward the measured characteristics to a port identifier corresponding to a calculator.

21. The apparatus of claim 15, wherein the apparatus comprises a directional transceiver configured for use indoors.

* * * * *